No. 820,933. PATENTED MAY 15, 1906.
H. A. LEWIS.
STROKE AND POWER CHANGING DEVICE.
APPLICATION FILED JUNE 16, 1904.
2 SHEETS—SHEET 1.
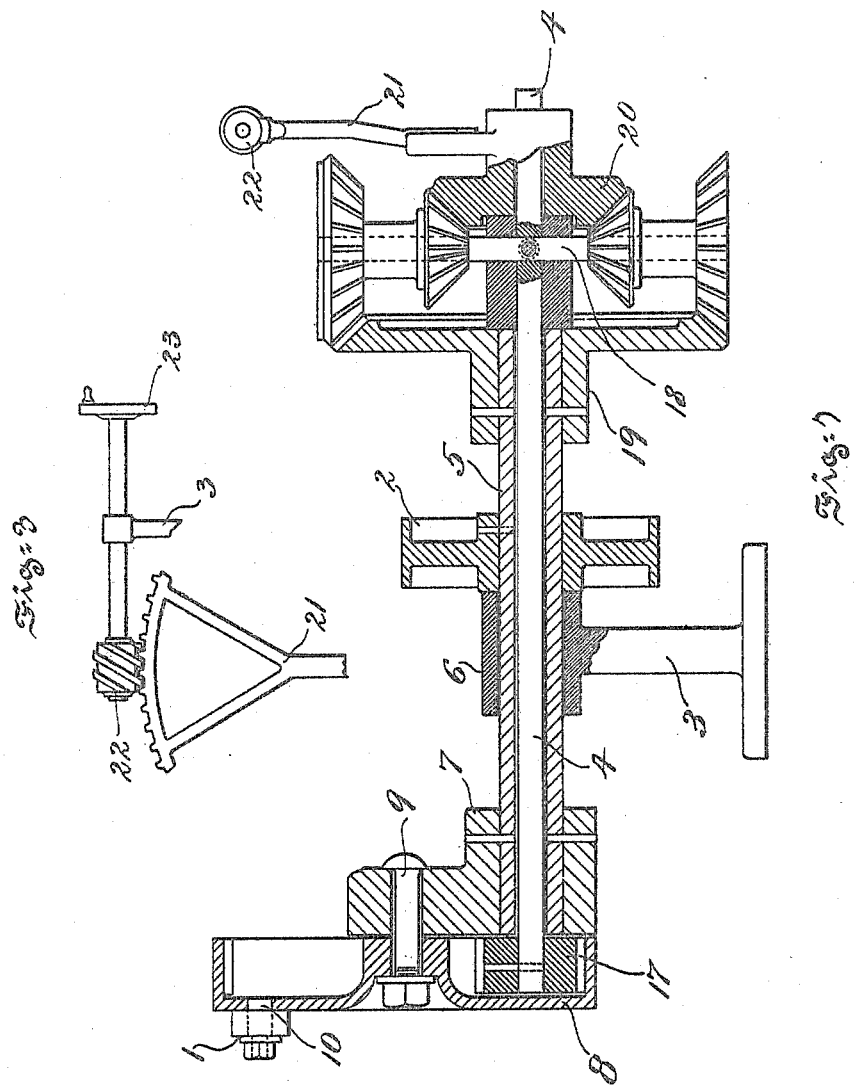

No. 820,933. PATENTED MAY 15, 1906.
H. A. LEWIS.
STROKE AND POWER CHANGING DEVICE.
APPLICATION FILED JUNE 18, 1904.
2 SHEETS—SHEET 2.
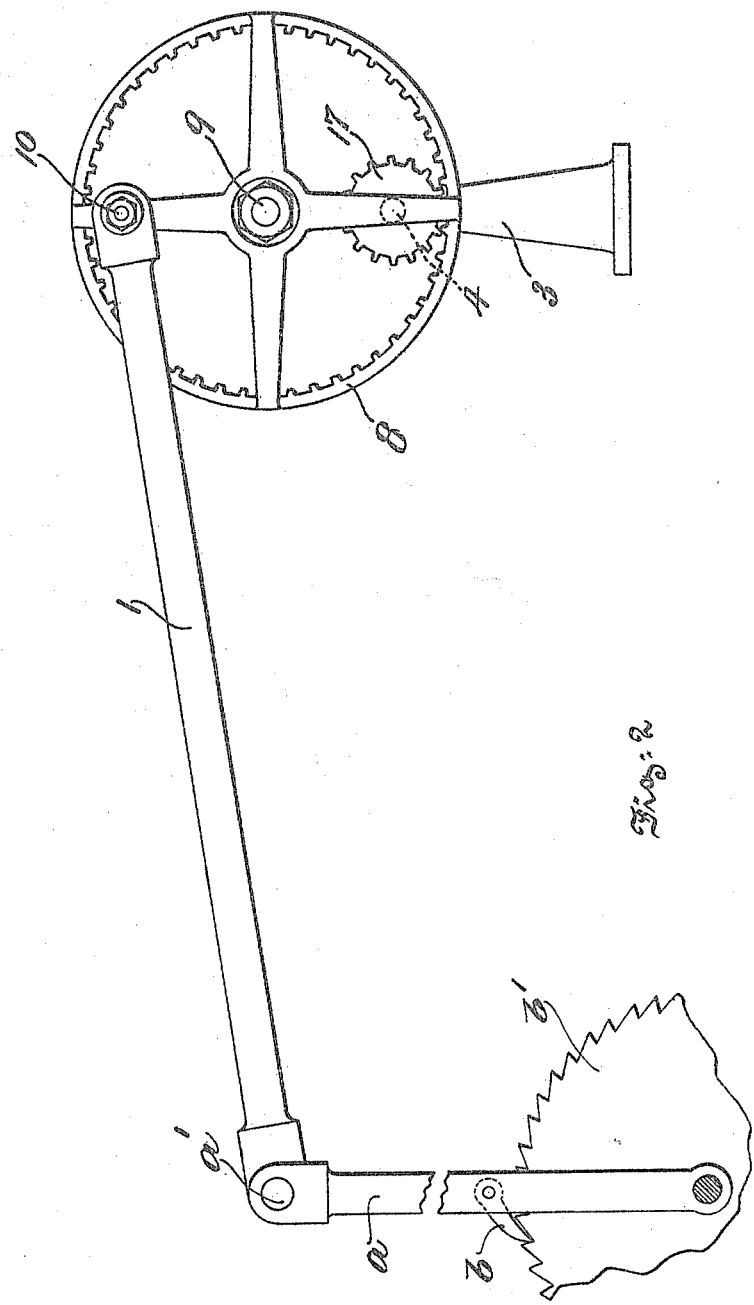

UNITED STATES PATENT OFFICE.

HARRY A. LEWIS, OF NORRISTOWN, PENNSYLVANIA.

STROKE AND POWER CHANGING DEVICE.

No. 820,933.      Specification of Letters Patent.      Patented May 15, 1906.

Application filed June 18, 1904. Serial No. 213,111.

*To all whom it may concern:*

Be it known that I, HARRY A. LEWIS, a citizen of the United States, residing at Norristown, in the county of Montgomery and State of Pennsylvania, have invented a certain new and useful Stroke and Power Changing Device, of which the following is a specification.

The object of the present invention is to provide compact, reliable, and efficient power-transmission mechanism for converting speed into torque or torque into speed, as may be required; and to this and other ends hereinafter set forth the invention comprises the mechanism to be presently described and finally claimed.

The nature, characteristic features, and scope of the invention will be more fully understood from the following description, taken in connection with the accompanying drawings, forming part hereof, and in which—

Figure 1 is a view principally in central section illustrating mechanism embodying features of the invention. Fig. 2 is an end view, principally in elevation, looking toward the right in Fig. 1; and Fig. 3 is an end view of portions of the mechanism looking toward the left in Fig. 1.

In the drawings, 2 may be considered to be the driving part, and 1 the driven part, although this is interchangeable; but this assumption will be made for the sake of clearness throughout the following description.

3 represents portions of some fixed support, or are parts fixed in respect to the mechanism itself.

4 is a shaft which normally revolves and is additionally turned when it is desired to change the ratio of speed and torque, as will be hereinafter described.

5 is a tubular shaft arranged concentrically with and so as to rotate upon the shaft 4 and also in a bearing, as 6. Fast upon the left-hand end of the shaft 5 is an arm 7, which of course turns around with it, and the eccentric carries upon its face a circular disk 8. This disk normally turns with the arm 7 as one piece; but when it is desired to change the relation of speed and torque it may be turned in respect to the arm 7, as will be described.

9 is a stud arranged to connect the parts 7 and 8 in such a way that the part 8 may be turned in respect to the part 7. The shaft 4 has fast upon its left-hand end a toothed wheel 17, which meshes with internal teeth in the part 8. The part 1 is pivoted by means of the stud 10 to the disk 8 and power may be taken from it by means of the ratchet-arm *a*, pivoted to it at *a'*, and the pawl *b* and ratchet-wheel *b'*.

For the sake of explanation a description will be given of how power is transmitted through the described mechanism, and for this purpose it will be assumed that the shafts 4 and 5 are in some way connected together. Thereafter it will be explained how a change of the relative positions of the shafts 4 and 5 effects a variation in the transmission. Assuming that the shafts 4 and 5 are in some way caused to rotate together and that power is applied to the part 2, the arm 7 is turning around the axis of the wheel 17 and is carrying the disk 8 and there is no relative movement between the arm 7 and the part 8 and the wheel 17. Under the conditions mentioned and illustrated in the drawings the stud 10 is at the greatest possible distance from the axis of rotation of the arm 7, or, in other words, the axis of rotation of the arm 7 and stud 10 are one hundred and eighty degrees apart. Thus there is transmitted the maximum of speed and the minimum of torque. If now the shaft 4 be turned and subsequently caused to rotate with the shaft 5, the effect will be to turn the disk 8 around its pivot 9, and thus bring the stud 10 nearer to the axis of rotation of the arm 7—that is, the center of the shaft 4. If it were turned through one hundred and eighty degrees, they would be in line with each other and the driven part 1 would not move. If it were turned to intermediate points, there would clearly be a corresponding change of speed and torque in the transmission.

A description will now be given of mechanism appropriate for turning the parts 4 and 5 in respect to each other while the mechanism is running. Attached to the shaft 4 is an arm 18, which carries loose beveled gears meshing, respectively, with a beveled gear 19, secured to the shaft 5, and with a beveled gear 20. The latter is fitted with an arm 21, positioned adjustably by means of worm-gearing 22, which can be operated, as by hand-wheel 23. The effect of this gearing is well understood, and so long as the beveled gear 20 remains at rest the shafts 4 and 5 turn together; but when the beveled gear 20 is turned one way or the other those shafts 4 and 5 while still rotating are turned in respect to each other, which is the object sought.

It will be obvious to those skilled in the art to which my invention relates that modifications may be made in details without departing from the spirit thereof. Hence the invention is not limited further than may be required by the prior state of the art; but,

Having thus described the nature and objects of the invention, what I claim as new, and desire to secure by Letters Patent, is—

1. Power-transmission mechanism comprising a tubular shaft provided with an arm, a disk centrally pivoted to the end of said arm and provided with a stud or crank-pin and with internal teeth, and a second shaft arranged in said tubular shaft and a pinion mounted thereon meshing with said teeth, substantially as described.

2. Power-transmission mechanism comprising a driving part, a driven part, an arm connected with one of said parts, a disk centrally pivoted to the arm and provided with internal teeth and having pivotal connection with the driven part, a pinion engaging said teeth, pawl-and-ratchet connections for the driven part, and means for changing the angular relation between the axis of rotation of the arm and said pivotal connection, substantially as described.

3. Power-transmission mechanism comprising a driving part, a driven part, an arm carried by one of said parts, a toothed member having pivotal connection with the other of said parts and rotatably mounted on the arm, a toothed wheel meshing with the teeth of said member, a tubular shaft carrying the arm, a shaft arranged within the tubular shaft and carrying said toothed wheel, an arm connected with said shaft, sets of beveled gears carried by said arm, a beveled gear on said tubular shaft meshing with one of the sets of beveled gears, a second beveled gear meshing with the other of said sets of beveled gears, and means for positioning and holding the last-mentioned beveled gear, substantially as described.

In testimony whereof I have hereunto signed my name.

HARRY A. LEWIS.

In presence of—
O. F. LENHARDT,
FRANK E. FRENCH.